United States Patent
Smith et al.

(10) Patent No.: US 9,411,590 B2
(45) Date of Patent: Aug. 9, 2016

(54) METHOD TO IMPROVE SPEED OF EXECUTING RETURN BRANCH INSTRUCTIONS IN A PROCESSOR

(71) Applicant: QUALCOMM Incorporated, San Diego, CA (US)

(72) Inventors: Rodney Wayne Smith, Raleigh, NC (US); Jeffery M. Schottmiller, Raleigh, NC (US); Michael Scott McIlvaine, Raleigh, NC (US); Brian Michael Stempel, Raleigh, NC (US); Melinda J. Brown, Raleigh, NC (US); Daren Eugene Streett, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 704 days.

(21) Appl. No.: 13/833,844

(22) Filed: Mar. 15, 2013

(65) Prior Publication Data

US 2014/0281394 A1    Sep. 18, 2014

(51) Int. Cl.
  *G06F 9/30* (2006.01)
  *G06F 9/38* (2006.01)

(52) U.S. Cl.
  CPC ........ *G06F 9/30058* (2013.01); *G06F 9/30054* (2013.01); *G06F 9/3806* (2013.01)

(58) Field of Classification Search
  CPC .............. G06F 9/30101; G06F 9/3806; G06F 9/30058; G06F 9/30054
  See application file for complete search history.

(56) References Cited

U.S. PATENT DOCUMENTS

| | | | |
|---|---|---|---|
| 4,112,495 A * | 9/1978 | Easley | G06F 9/322 708/100 |
| 4,164,037 A * | 8/1979 | Cochran | G06F 15/02 708/100 |
| 5,179,673 A * | 1/1993 | Steely, Jr. | G06F 9/322 712/239 |
| 5,193,205 A * | 3/1993 | Matsuo | G06F 9/3806 712/239 |
| 5,623,614 A | 4/1997 | Van et al. | |
| 6,092,188 A | 7/2000 | Corwin et al. | |
| 6,170,054 B1 | 1/2001 | Poplingher | |
| 7,617,387 B2 | 11/2009 | Smith et al. | |
| 2008/0040576 A1 | 2/2008 | Stempel et al. | |
| 2011/0320790 A1* | 12/2011 | Dieffenderfer | G06F 9/3806 712/239 |
| 2014/0143522 A1 | 5/2014 | Saidi et al. | |

OTHER PUBLICATIONS

Mark Allen Weiss, Data Structures & Algorithm Analysis in C++, 1999, Addison Wesley Longman, second edition, pp. 93-108.*
International Search Report and Written Opinion—PCT/US2014/029778—ISA/EPO—Jul. 1, 2014.

* cited by examiner

*Primary Examiner* — Idriss N Alrobaye
*Assistant Examiner* — Courtney Carmichael-Moody
(74) *Attorney, Agent, or Firm* — Muncy, Geissler, Olds & Lowe, P.C.

(57) ABSTRACT

An apparatus and method for executing call branch and return branch instructions in a processor by utilizing a link register stack. The processor includes a branch counter that is initialized to zero, and is set to zero each time the processor decodes a link register manipulating instruction other than a call branch instruction. The branch counter is incremented by one each time a call branch instruction is decoded and an address is pushed onto the link register stack. In response to decoding a return branch instruction and provided the branch counter is not zero, a target address for the decoded return branch instruction is popped off the link register stack, the branch counter is decremented, and there is no need to check the target address for correctness.

5 Claims, 4 Drawing Sheets

METHOD TO IMPROVE SPEED OF EXECUTING RETURN BRANCH INSTRUCTIONS IN A PROCESSOR

FIELD OF DISCLOSURE

Embodiments of the present invention are directed to microprocessors.

BACKGROUND

A call branch instruction allows program control to branch to a section of code that implements a subroutine (function). For example, when a call branch instruction executes, the address in the program counter is incremented and loaded into a link register to be recalled later, and the address of the first line of code in the called subroutine is loaded into the program counter so that program control branches to the section of code representing the called subroutine. A return branch instruction at the end of the section of code causes program control to return to the address stored in the link register, thereby returning to the instruction next in program order after the call branch instruction that called the subroutine.

To implement nested or recursive subroutines (functions), that is, where a subroutine calls another subroutine (which may be itself), software may utilize a stack in memory. For example, if an address has been loaded into the link register due to a first subroutine call, and if a second subroutine is called within the code representing the first subroutine, then the address that was loaded into the link register when the first subroutine was called is pushed onto the top of the stack in memory by software convention, and an address representing the next instruction in program order after the second branch instruction is loaded into the link register. When a return branch instruction for the second called subroutine is executed, the address stored in the link register is loaded into the program counter, and the address at the top of the stack is then popped off and loaded into the link register so that program control may return to the instruction immediately following (in program order) the first branch instruction when the first subroutine completes.

SUMMARY

Embodiments of the invention are directed to systems and methods to reduce the number of processor cycles for executing return branch instructions utilizing a link register stack.

In an embodiment, a method includes setting a state machine to an initial state in response to the processor decoding link register manipulating instructions other than call branch instructions; and changing a state machine in response to decoding a call branch instruction or a return branch instruction to a state indicative of a number of call branch instructions decoded by the processor since the processor decoded a link register manipulating instruction other than call branch instructions and for which the processor has not decoded corresponding return branch instructions. The method further includes popping from a link register stack a target address and using the target address as an address to fetch a next instruction in response to the processor fetching and decoding a return branch instruction, provided the state of the state machine indicates at least one call branch instruction has been decoded since the processor decoded a link register manipulating instruction other than call branch instructions, and for which a corresponding return branch instruction has not been decoded; and completing execution of the return branch instruction without checking the target address for correctness.

In another embodiment, a method includes setting a counter to an initial value in response to the processor decoding link register manipulating instructions other than call branch instructions; incrementing the counter by a first constant in response to the processor decoding a call branch instruction; and incrementing the counter by a second constant in response to the processor decoding a return branch instruction. The method further includes popping from a link register stack a target address for the return branch instruction in response to the processor determining that the value of the counter is not equal to the initial value and in response to the processor decoding the return branch instruction; and completing execution of the return branch instruction without checking the target address for correctness.

In another embodiment, an apparatus includes a link register; a branch counter; and a processor to set the branch counter to an initial value in response to decoding instructions other than call branch instructions that write to the link register; increment the branch counter by a first constant in response to decoding a call branch instruction; and increment the branch counter by a second constant in response to decoding a return branch instruction. The apparatus further includes a link register stack, where the processor pops from the link register stack a target address for the return branch instruction in response to determining that the value of the counter is not equal to the initial value and in response to decoding the return branch instruction; and completes the execution and retires the return branch instruction without checking the target address for correctness.

In another embodiment, a processor includes a branch counter, a link register stack; a means for setting a counter, the means for setting a counter to set the branch counter to an initial value in response to the processor decoding link register manipulating instructions other than call branch instructions; and a means for incrementing a counter, the means for incrementing a counter to increment the branch counter by a first constant in response to the processor decoding a call branch instruction, and to increment the branch counter by a second constant in response to the processor decoding a return branch instruction. The processor further includes a means for popping a link register stack, the means for popping a link register stack to pop from the link register stack a target address for the return branch instruction in response to the processor determining that the value of the branch counter is not equal to the initial value and in response to the processor decoding the return branch instruction; and the processor to complete the execution and retire the return branch instruction without checking the target address for correctness.

In another embodiment, a storage medium has stored instructions executable by a processor, the processor to perform a method when executing the instructions, the method comprising setting a counter to an initial value in response to the processor decoding link register manipulating instructions other than call branch instructions; incrementing the counter by a first constant in response to the processor decoding a call branch instruction; and incrementing the counter by a second constant in response to the processor decoding a return branch instruction. The method further includes popping from a link register stack a target address for the return branch instruction in response to the processor determining that the value of the counter is not equal to the initial value and in response to the processor decoding the return branch instruction; and completing execution of the return branch instruction without checking the target address for correctness.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments are expected to improve upon the use of a software stack by employing a hardware structure, termed herein a link register stack. The link register stack is used to store link register values (addresses) so that under proper circumstances, a target address for a return branch instruction may be forwarded from the link register stack to the pipeline without the need to verify correctness of the target address.

Figure 1:
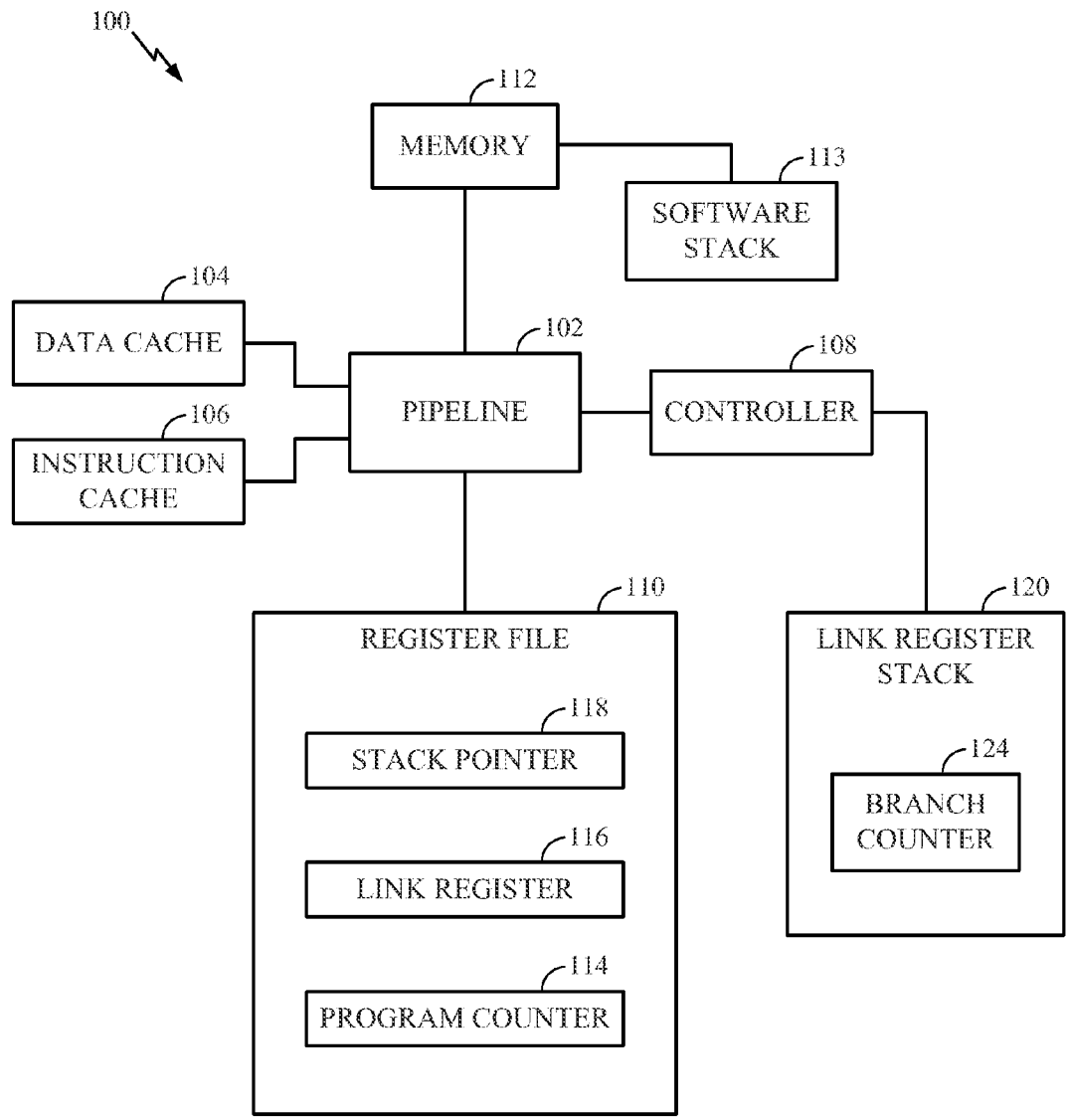
FIG. 1 abstracts a microprocessor according to an embodiment.

FIG. 1 is a simplified abstraction of a microprocessor 100 according to an embodiment. A pipeline 102 receives data from a data cache 104 and instructions from an instruction cache 106. A controller 108 controls various stages and execution units (such as a fetch stage, a decode stage, etc.) within the pipeline 102 to decode and execute instructions. Results from the executed instructions when they complete may be stored in a register file 110, in the data cache 104, and in other buffers or memory units represented by a memory 112. The memory 112 may represent a memory hierarchy. The software stack as described in the Background is an abstract memory type and is labeled 113.

The register file 110 comprises a plurality of registers, with three illustrated in FIG. 1: a program counter register 114; a link register 116; and a stack pointer register 118 for storing a pointer to the top of the software stack 113.

The link register stack is illustrated in FIG. 1 as a hardware memory structure labeled 120. The link register stack 120 may be a register file located on the same die (chip) as the microprocessor 100, and is shown as a structure separate from the register file 110. In practice, the link register stack 120 could be a part of the register file 110, but it is shown as a separate structure to indicate that it may not be part of the architected registers of the microprocessor 100. The link register stack 120 includes a branch counter, labeled 124. The role of the branch counter 124 is discussed later.

For an embodiment, the controller 108 is configured such that when the pipeline 102 decodes a call branch instruction, the address of the next (in program order) instruction is pushed onto the link register stack 120. (As discussed in the Background, this address is also stored as a value in the link register 116, where the previous value stored in the link register 116 is pushed onto the software stack 113 and pointed to by the address stored in the stack pointer register 118.)

For each call branch instruction in a software program for which a subroutine (function) is called, there is a return branch instruction at the end of the subroutine. One may view each such call branch instruction and return branch instruction as a pair of branch instructions. That is, the return branch instruction is paired with the call branch instruction. With this in mind, the branch counter 124 may be described as a structure to keep track of the number of call branch instructions decoded for which the pipeline 102 has not decoded return branch instructions paired with the decoded call branch instructions, and for which the pipeline 102 has not encountered a link register manipulating instruction. A link register manipulating instruction refers to any instruction, other than a call branch instruction, that writes to the link register 116.

The branch counter 124 is initialized to zero, and is set to zero each time the pipeline 102 decodes a link register manipulating instruction. Each time a call branch instruction is decoded and an instruction address is pushed onto the link register stack 120, the value of the branch counter 124 is incremented by one; and each time a return branch instruction is decoded and an instruction address is popped off the link register stack 120, the value of the branch counter 124 is decremented by one.

As long as there are no link register manipulating instructions since a first instruction address was pushed onto the link register stack 120, the values (addresses) stored in the link register stack 120 represent a correct history of the values (addresses) that have been written to the link register 116. Accordingly, as long as the value of the branch counter 124 is greater than zero, the state of the link register stack 120 represents a correct history of the link register 116.

For an embodiment, the controller 108 is configured such that when the pipeline 102 decodes a return branch instruction, and provided the value stored in the branch counter 124 is greater than zero, the address at the top of the link register stack 102 is forwarded to the pipeline 102 as the target address for the decoded return branch instruction. Because the value stored in the branch counter 124 is greater than zero, the address popped off the link register stack 102 is the correct target address, and therefore no check for correctness needs to be performed for the decoded return branch instruction to complete execution and retire.

If, however, the value of the branch counter 124 is zero when the pipeline 102 decodes a return branch instruction, then there is no guarantee that the state of the link register stack 120 represents the correct history of the link register 116, in which case the controller 108 manages the pipeline 102 in a conventional manner, whereby the software stack 113 is used as discussed in the Background to provide a predicted target address, and a check for correctness is performed before the decoded return branch instruction is allowed to complete execution and retire.

By using the branch counter 124, embodiments may use the link register stack 120 for target addresses in the case of nested subroutines, where a called subroutine calls another subroutine, so long as there are no intervening link register manipulating instructions that manipulate (write into) the link register 116.

A processor according to such an embodiment is expected to save processor cycles, thereby saving power and time.

Figure 2:
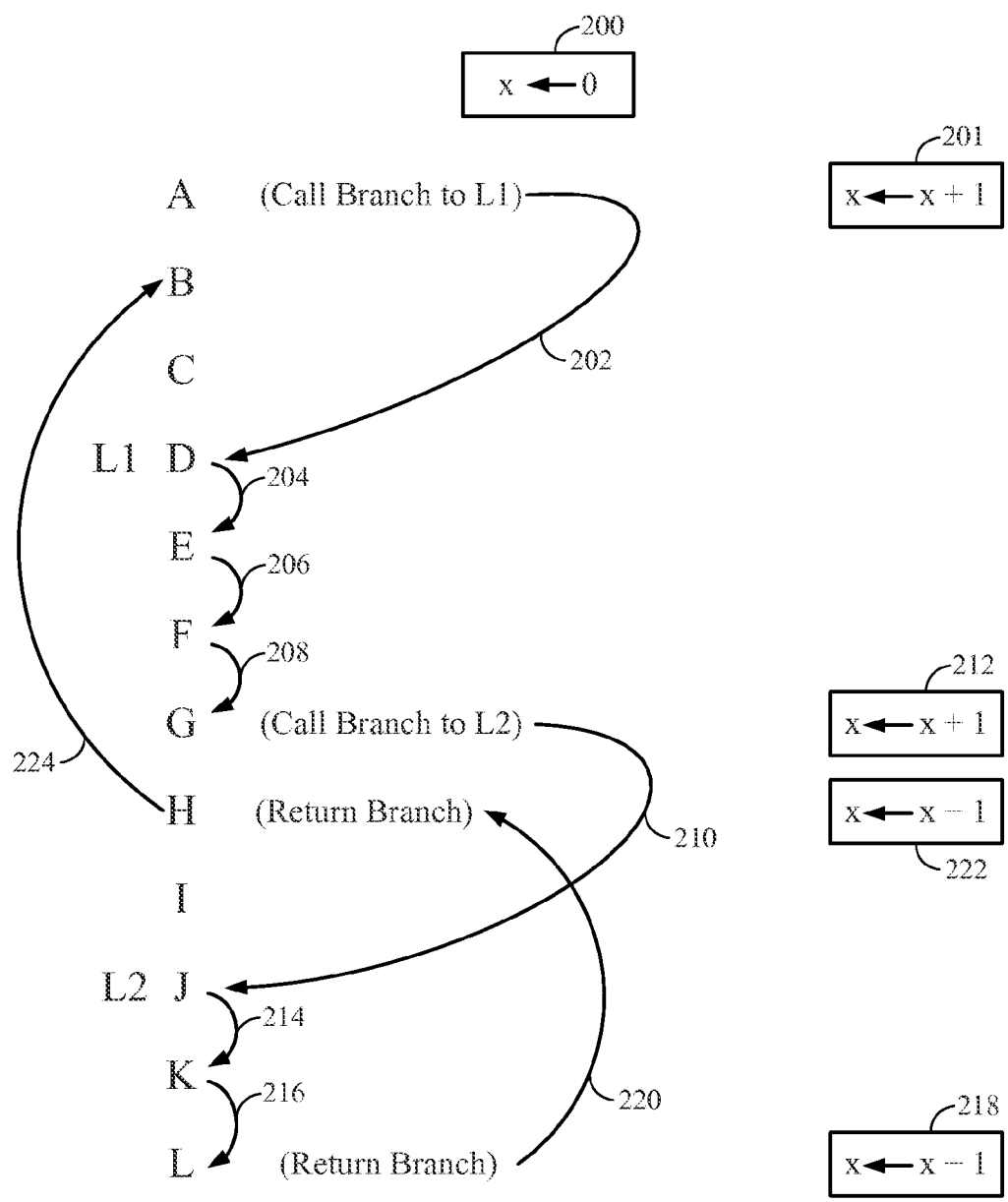
FIG. 2 illustrates instruction flow according to an embodiment.

FIG. 2 illustrates an embodiment by considering instruction flow in a segment of code. The letters A through L represent instructions in the code segment. For purposes of describing the embodiment of FIG. 2, the variable x denotes the value of the branch counter 124. Before executing the code segment, the value of the branch counter 124 is set to zero, as indicated by the label 200.

The first instruction in the code segment illustrated in FIG. 2 is the instruction A, a call branch instruction to the instruction labeled L1, which is the instruction D in FIG. 2. Upon decoding and executing the call branch instruction A, the address for the instruction B is written to the link register 116 and also pushed onto the link register stack 120. The branch counter 124 is incremented by one, indicated by the label 201 in FIG. 2. The value of the branch counter 124 is now 1.

The program counter register 114 is now set to the address of the instruction D, and the instruction flow in the pipeline 102 proceeds from the instruction A to the instruction D, as indicated by the arrow labeled 202. The instruction flow then proceeds from the instruction D to the instruction E, from the instruction E to the instruction F, and from the instruction F to the instruction G, as indicated by the arrows labeled 204, 206, and 208 in FIG. 2.

The instruction G is a call branch instruction to the instruction labeled L2, which is the instruction J in FIG. 2. The address of the instruction J is loaded into the program counter register 114, and control is brought to the instruction J as indicated by the arrow labeled 210. The address for the instruction H is pushed onto the link register stack 120 and is written to the link register 116. The branch counter 124 is incremented by one, as indicated by the label 212. The value of the branch counter 124 is now equal to 2.

Because the program counter register 114 has been set to the address of the instruction J, instruction flow in the pipeline 102 proceeds from the instruction J to the instruction K, and then from the instruction K to the instruction L, as indicated by the arrows labeled 214 and 216.

The instruction L is a return branch instruction, and because the value of the branch counter 124 (x in FIG. 2) is greater than zero, the state of the link register stack 120 is known to be correct, and consequently the target address popped from the top of the link register stack 120 is correct. Therefore, there is no need to check the popped address for correctness as the instruction L is executed and completes. This popped address is the address for the instruction H. The branch counter 124 is decremented by one upon decoding and executing the instruction L, as indicated by the label 218. The value of the branch counter 124 is now 1.

Continuing with the example illustrated in FIG. 2, because the target for the instruction L is the address of the instruction H, where the instruction H is the instruction immediately following in program order the call branch instruction G, program control is brought to the instruction H as indicated by the arrow labeled 220.

The instruction H is decoded as a return branch instruction, and because the value of the branch counter 124 is greater than zero, it is known that the state of the link register stack 120 is correct, and therefore the target address popped off the link register stack 120 is the correct target address. This target address is the instruction address for the instruction B, and it need not be checked for correctness as the instruction H executes and completes. Upon execution of the instruction H, the branch counter 124 is decremented by one as indicated by the label 222, and control is brought to the instruction B as indicated by the arrow labeled 224. The value of the branch counter 124 is now zero.

As described previously, the controller 108 is configured such that upon decoding and executing a link register manipulating instruction, that is, an instruction other than a call branch instruction that writes to the link register 116, the value of the branch counter 124 is set to zero. If a return branch instruction is decoded and begins execution in which the value of the branch counter 124 is zero, then there is no guarantee that the state of the link register stack 120 is correct. Therefore, if the predicted target address is popped from the software stack 113, then it should be checked for correctness before the return branch instruction completes execution and retires.

Figure 3:
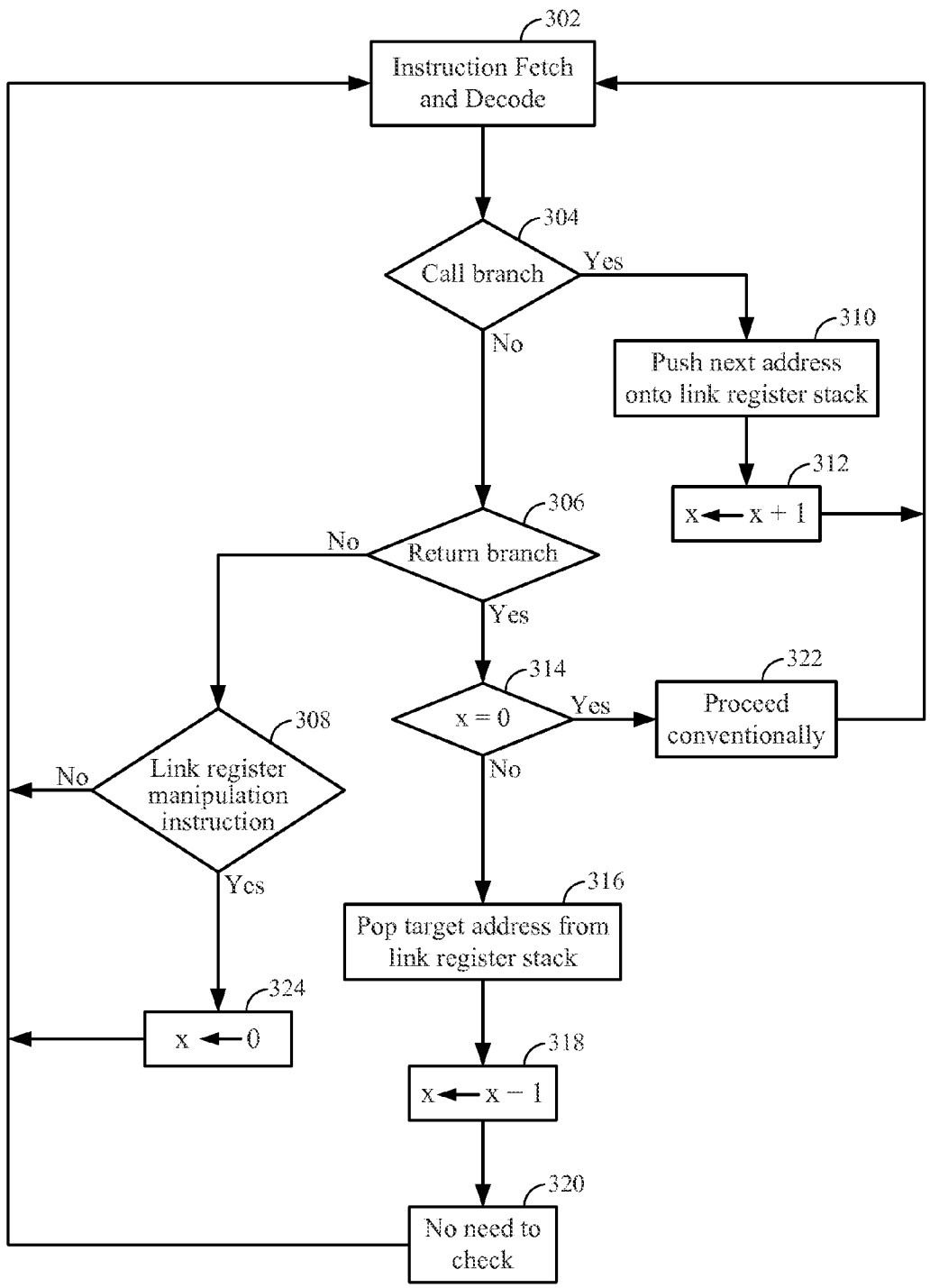
FIG. 3 illustrates a flow diagram according to an embodiment.

FIG. 3 illustrates a flow diagram according to an embodiment. Starting from the step labeled 302, when an instruction is fetched from the instruction cache 106 and decoded, the decision flow in FIG. 3 depends upon whether the decoded instruction is a call branch instruction, a return branch instruction, or a link register manipulating instruction. Without loss of generality, the order in determining which of these three instructions is the decoded instruction is indicated in FIG. 3 with labels 304, 306, and 308. However, it is to be understood that for other embodiments these determinations may not be ordered as indicated in FIG. 3.

Referring to the step 304, a determination is made as to whether the instruction is a call branch instruction. If it is, then the address of the next (in program order) instruction is pushed onto the link register stack 120 as indicated in the step 310, and the value of the branch counter 124 is incremented by one ($x \leftarrow x+1$) as indicated in the step 312. FIG. 3 shows the flow diagram returning to the step 302 after implementing the action of the step 312. The data flow from the step 312 to the step 302 is not to imply that the next action taken in an actual embodiment pipeline after the step 312 is necessarily an instruction fetch, but the data flow is illustrated as such merely for convenience so as to describe the actions taken by an embodiment.

Referring to the step 306, a determination is made as to whether the instruction is a return branch instruction. If it is, and the value of the branch counter 124 is greater than zero (step 314), then the target address is popped off the link register stack 120 (step 316) to be forwarded to the pipeline 102 and written to the program counter register 114; the branch counter 124 is decremented by one (step 318); and there is no need to check the target address for correctness when the instruction executes and completes, step 320.

If, however, in step 314 it is determined that the value of the branch counter 124 is zero, then the microprocessor 100 proceeds in a conventional manner whereby if a predicted target address is used, then it should be checked for correctness (step 322).

FIG. 3 shows the flow diagram returning to the step 302 after implementing the actions of the steps 320 or 322, but as discussed previously, such process flows are introduced merely for convenience.

Referring to the step 308, a determination is made as to whether the instruction is any instruction (other than a call branch instruction) that manipulates (e.g., writes into) the link register 116. If it is, then the value of the branch counter 124 is reset to zero (x←0), as indicated in the step 324. Otherwise, control is brought back to the step 302. Again, the flow diagram returning to the step 302 after implementing the actions of the steps 308 and 324 is introduced merely for convenience.

We assume the convention that the branch counter 124 is not decremented past zero. That is, it may happen that the pipeline 102 decodes a return branch instruction, but the branch counter 124 is already set to zero because the pipeline 102 decoded a link register manipulating instruction other than a call branch instruction. In that case, the branch counter 124 remains at zero.

It should be appreciated that in general a state machine may implement the actions of the branch counter 124, where the state keeps track of the number of call branch instructions decoded by the processor 100 since decoding an intervening link register manipulating instruction and for which the return branch instructions paired with the decoded call branch instructions have not yet been decoded.

For example, it is not necessary that a counter be incremented by one each time a call branch instruction is decoded, decremented by one each time a return branch instruction is decoded, or reset to zero each time a link register manipulating instruction is decoded. As a specific example, the direction of the counter may be reversed, where the counter is initialized to its maximum value, is decremented each time a call branch instruction is decoded, and is incremented each time a return branch instruction is decoded. The flow diagram represented by FIG. 3 can be adjusted accordingly for this specific example.

The actions described with respect to FIG. 3 may be implemented in hardware realized in the controller 108. For some embodiments, some or all of the actions illustrated in FIG. 3 may be realized by instructions executing in the controller 108, such instructions being viewed as firmware or software, and where such instructions may be stored in the memory 112.

Figure 4:
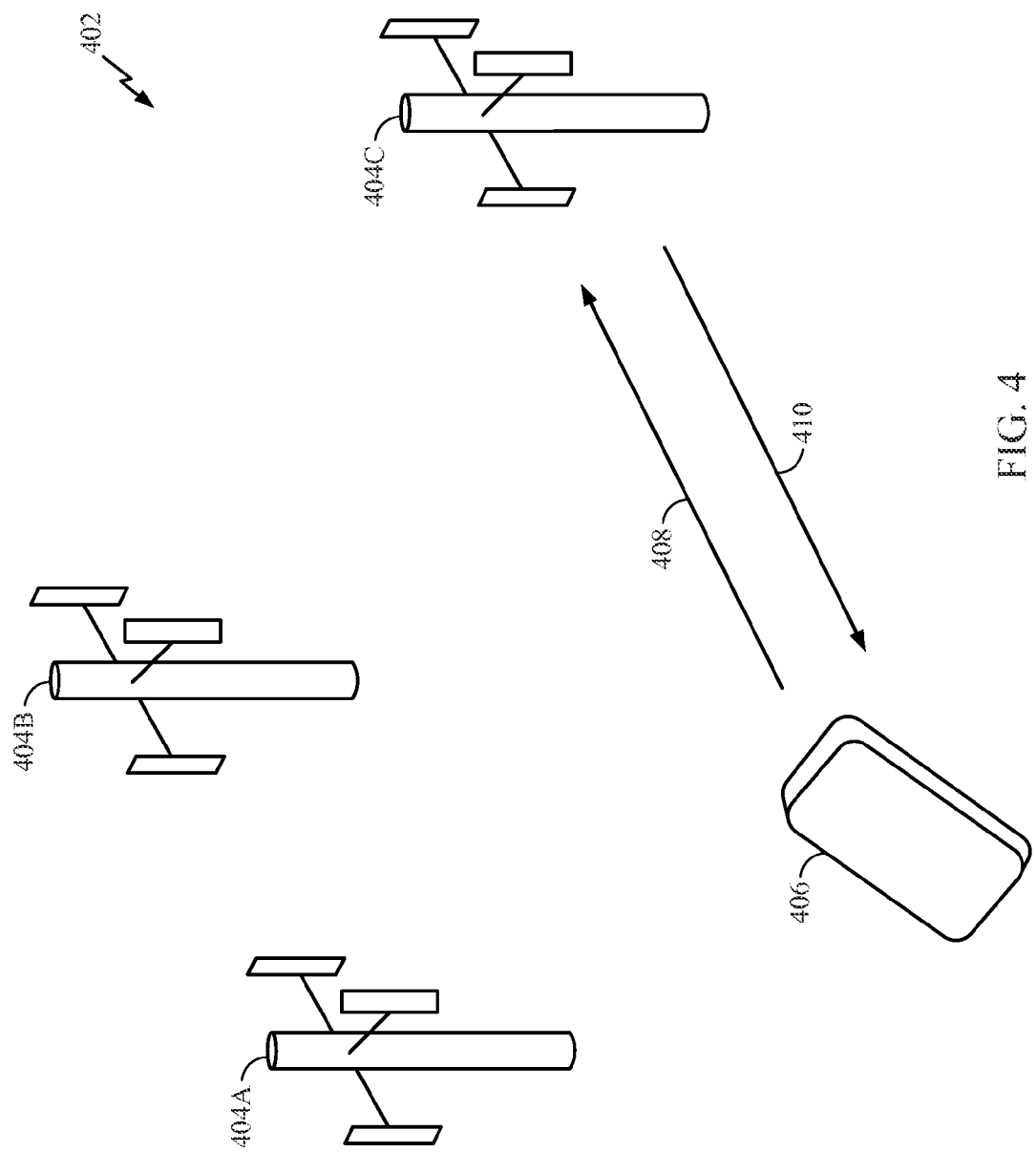
FIG. 4 is a wireless communication system that includes an embodiment.

FIG. 4 illustrates a wireless communication system in which embodiments may find application. FIG. 4 illustrates a wireless communication network 402 comprising base stations 404A, 404B, and 404C. FIG. 4 shows a communication device, labeled 406, which may be a mobile cellular communication device such as a so-called smart phone, a tablet, or some other kind of communication device suitable for a cellular phone network, such as a computer. The communication device 406 need not be mobile. In the particular example of FIG. 4, the communication device 406 is located within the cell associated with the base station 404C. The arrows 408 and 410 pictorially represent the uplink channel and the downlink channel, respectively, by which the communication device 406 communicates with the base station 404C.

Embodiments may be used in data processing systems associated with the communication device 406, or with the base station 404C, or both, for example. FIG. 4 illustrates only one application among many in which the embodiments described herein may be employed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. In the particular example of FIG. 1, the software module or modules may be stored in the memory 112. An exemplary storage medium is coupled to the processor such that the processor can read information from, and write information to, the storage medium. In the alternative, the storage medium may be integral to the processor.

Accordingly, an embodiment of the invention can include a non-transitory computer-readable medium embodying a method to improve the speed of executing return branch instructions. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for executing call branch and return branch instructions in a processor, the method comprising:
    setting a counter to an initial value in response to the processor decoding link register manipulating instructions other than call branch instructions;
    incrementing the counter by a first constant in response to the processor decoding a call branch instruction;
    pushing onto a link register stack an address of a next in program order instruction in response to the processor decoding the call branch instruction;
    incrementing the counter by a second constant in response to the processor decoding a return branch instruction provided the counter has a value not equal to the initial value;
    popping from the link register stack a target address for the return branch instruction in response to the processor decoding the return branch instruction provided the counter has a value not equal to the initial value, wherein when the value of the counter is not equal to the initial value, the target address popped from the link register stack is a correct target address for the return branch instruction; and
    completing execution of and retiring the return branch instruction without checking the target address for correctness.

2. The method of claim 1, wherein
    the initial value is zero;
    the first constant is equal to one; and
    the second constant is equal to negative one.

3. An apparatus comprising:
    a link register;
    a link register stack;
    a branch counter; and
    a processor configured to:
    set the branch counter to an initial value in response to decoding instructions other than call branch instructions that write to the link register;
        increment the branch counter by a first constant in response to decoding a call branch instruction;
        push onto the link register stack an address of a next in program order instruction in response to the processor decoding the call branch instruction;
        increment the branch counter by a second constant in response to decoding a return branch instruction provided the branch counter has a value not equal to the initial value;
        pop from the link register stack a target address for the return branch instruction in response to the processor decoding the return branch instruction provided the branch counter has a value not equal to the initial value, wherein when the value of the branch counter is not equal to the initial value, the target address popped from the link register stack is a correct target address for the return branch instruction; and
        complete execution of and retire the return branch instruction without checking the target address for correctness.

4. The apparatus of claim 3, wherein
    the initial value is zero;
    the first constant is equal to one; and
    the second constant is equal to negative one.

5. The apparatus of claim 3, wherein the apparatus is chosen from the set consisting of a cellular phone and a base station.

* * * * *